Feb. 17, 1959     J. P. BARDIN ET AL     2,874,241
TIRE PRESSURE INDICATORS
Filed July 11, 1957
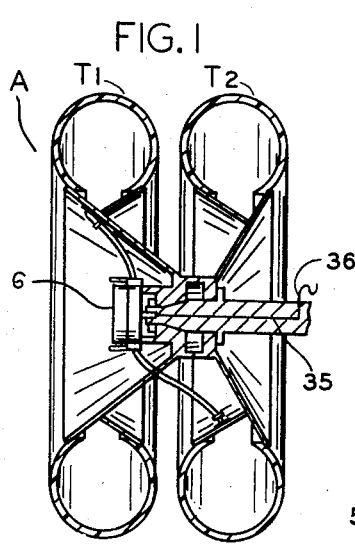
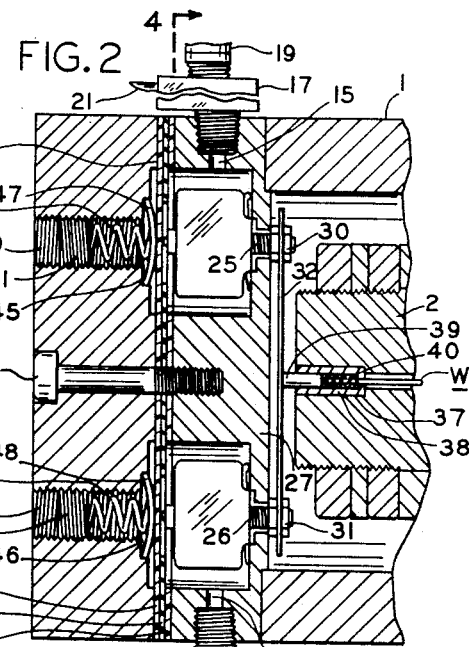
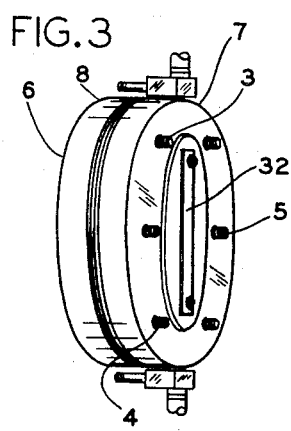
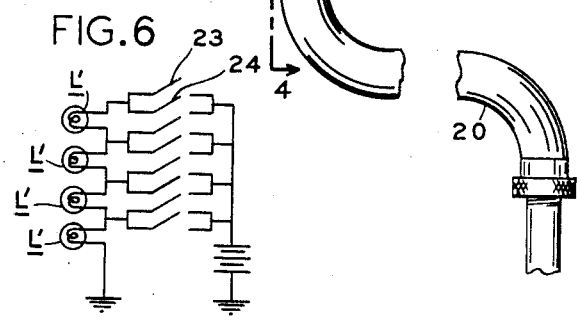
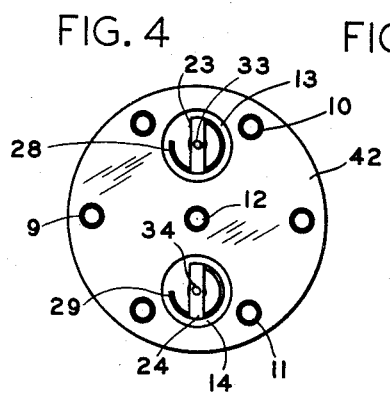
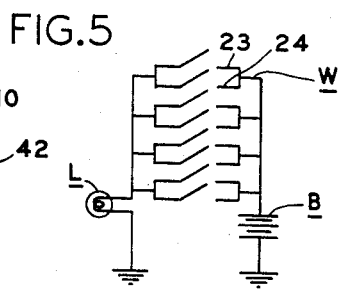
INVENTOR.
JOE P. BARDIN
WALTER H. DUDAR
BY
*Alfred W Petchaft*
ATTORNEY

United States Patent Office 2,874,241
Patented Feb. 17, 1959

2,874,241

TIRE PRESSURE INDICATORS

Joe P. Bardin and Walter H. Dudar, Dallas, Tex.

Application July 11, 1957, Serial No. 671,235

8 Claims. (Cl. 200—61.25)

This invention relates in general to new and useful improvements in tire pressure indicators and, more particularly, to a device for audibly or visually signaling the vehicle operator when the pressure in one or more of the tires on the vehicle has dropped below a predetermined minimum value.

In large truck-tractors and trailer having axles equipped with dual tires, it is extremely difficult to visually judge whether or not the tires are inflated to the proper pressure. In addition, it frequently happens that a small leak will develop in one or more of the tire during actual operation of the vehicle, in which case one of the dual tires will become partially or even totally deflated resulting in overloading and, in time, irreparable damage to the other tire. While a careful driver will usually check his tires at all service or refueling stops, modern high-speed trucks frequently have an operating range of several hundred miles and, more often than not, any leaks which may develop in the tires do so during operation, so that by the time the tires are checked for proper pressure, the damage due to overload of the other tire will already have been done. As a result, it is desirable that the driver be warned of pressure losses in the tires as soon as it drops below the proper operating level. Furthermore, many trucks currently manufactured today, particularly delivery or pickup trucks, are equipped with tubeless tires and frequently such tubeless tires are designed to operate at pressures somewhat below corresponding sizes of tires equipped with inner tubes. Consequently, in the case of lower pressure tubeless tires, a loss of several pounds of air pressure represents a greater percentage decrease in pressure than that of a tube-type tire operating at a somewhat higher pressure with the result that tubeless tires may become overloaded by a loss of several pounds of air pressure. Therefore, it becomes even more imperative that the driver be warned of loss in air pressure if his vehicle is equipped with lower pressure tubeless tires, and any warning device used must be quite sensitive and capable of rapidly responding to a drop in tire pressure.

It is, therefore, one of the objects of the present invention to provide a tire pressure indicator which will promptly signal the driver when the pressure in one or more tires drops below a predetermined minimum value.

It is also an object of the present invention to provide a tire pressure indicator of the type stated particularly adapted to be used with dual tires and embodying sensory means capable of rapidly responding to reduction of the pressure in either of the dual tires below a predetermined amount.

It is an additional object of the present invention to provide a tire pressure indicator of the type stated which is relatively easy to install on existing vehicles.

It is a further object of the present invention to provide a tire pressure indicator of the type stated which permits convenient inflation of either of the dual tires.

It is also an object of the present invention to provide a tire pressure indicator of the type stated which eliminates the need for rotary hermetic seals and is, therefore, relatively trouble-free in operation.

With the above and other objects in view, our invention resides in the novel features of form, construction, arrangement, and combination of parts presently described and pointed out in the claims.

In the accompanying drawing—

Fig. 1 is an elevational view, partly broken away and in section, showing a dual tire and wheel assembly having mounted thereon a tire pressure indicator constructed in accordance with and embodying the present invention;

Fig. 2 is an enlarged fragmentary sectional view similar to Fig. 1;

Fig. 3 is a perspective view of the tire pressure sensing unit forming part of the present invention;

Fig. 4 is a fragmentary sectional view taken along line 4—4 of Fig. 2;

Fig. 5 is a schematic wiring diagram of the electrical circuit forming part of the present invention; and Fig. 6 is a schematic wiring diagram of a modified form of the electrical circuit forming part of the present invention.

Referring now in more detail and by reference characters to the drawings, which illustrate practical embodiments of the present invention, A designates a dual tire wheel assembly comprising tires $T^1$, $T^2$, mounted in a conventional manner upon a hub 1, which, in turn, is concentric with, and rotatably mounted upon, an axle-spindle 2. Secured to the outer end of the hub 1 by means of bolts 3, 4, 5, is a cylindrical sensing unit 6 which is split in the provision of a base member 7 and a cap member 8. The base member 7 and cap member 8 are secured together by means of equally spaced peripheral bolts 9, 10, 11, and a central bolt 12. The base member 7 is, furthermore, formed with spaced cylindrical chambers 13, 14, and extending radially outwardly from the chambers 13, 14, are passageways 15, 16, which terminate at the outer periphery of the base member 7. The chambers 13, 14, are tapped for reception of nipples 17, 18, and threaded into the nipples 17, 18, are conduits 19, 20, which are, in turn, connected to the valve stems of the tires $T^1$, $T^2$. Also threaded into the nipples 17, 18, and extending outwardly therefrom are filling stems 21, 22, by which the tires $T^1$, $T^2$, may be inflated or deflated. The filling stems 21, 22, are provided with valve cores which are of conventional construction and are, therefore, not shown or described.

Mounted within the chambers 13, 14, are highly sensitive microswitches 23, 24, each having a plastic or otherwise non-conductive body including terminal stems 25, 26, which project through the rear wall 27 of the base member 7, and also positioned within the chambers 13, 14, are coil springs 28, 29, which bias the switches 23, 24, toward the cap member 8 so as to hold them snugly within the chambers 13, 14, in the manner shown in Figs. 2 and 5. Joining the outer ends of the stems 25, 26, and secured thereon by means of nuts 30, 31, is a rectangular metallic collector ring 32, which is located in outwardly spaced parallel relation to the end of the axle-spindle 2. It will be apparent that the collector ring 32 connects the switches 23, 24, in parallel. Also provided on the microswitches 23, 24, and extending toward the open ends of the chambers 13, 14, are plungers 33, 34, which can be depressed so as to make and break the electrical contacts within the switches 23, 24, for purposes presently more fully appearing.

The axle-spindle 2 is provided with a concentric bore 35 which terminates at its inner end in a radially extending portion 36 and at its outer end in a diametrally enlarged portion 37, the latter being adapted to receive an insulating sleeve 38. The sleeve 38 is also centrally bored for reception of a brush 39 and a compression spring 40 for biasing the outer end of the brush 39 in contact with the collector ring 32. Connected to the inner end of the brush 39 and extending along the bores 35, 36, is a lead wire w, which is, in turn, connected through the vehicle battery B to a warning light l, as schematically shown in Fig. 5.

Disposed between the base member 7 and cap member 8 is a sealing gasket 41 which is suitably punched out to conform to the contour of the outer face 42 of the base member, and disposed adjacent the sealing gasket 41 is a similarly shaped thin metallic separator plate 43. The inner face 44 of the cap member 8 is counterbored in the provision of shallow circular recesses 45, 46, which are concentric with the chambers 13, 14, and loosely disposed in the recesses 45, 46, are arcuate discs 47, 48, the outer surfaces of which extend beyond the face 44 in the manner shown in Fig. 2, and disposed against the face 44 and discs 47, 48, is a resilient rubber diaphragm 49. The cap member 8 is also provided with tapped holes 50, 50', in alignment with the recesses 45, 46, for reception of adjusting screws 51, 52, and disposed between the adjusting screws 51, 52, and the discs 47, 48, are compression springs 53, 54, which bias the discs 47, 48, against the diaphragm 49.

In use, the tires $T^1$, $T^2$, are filled through the inflation stems 21, 22, to the desired operating pressure. Since the chambers 13, 14, communicate with the tires $T^1$, $T^2$, respectively, through the passageways 15, 16, the pressure in each of the chambers 13, 14, will be the same as that in its associated tire $T^1$, $T^2$, and the pressure in each chamber 13, 14, will bear against the diaphragm 49. The adjusting screws 51, 52, may then be rotated so as to cause the springs 53, 54, to urge the discs 47, 48, against the rubber diaphragm 49 in opposition to the pressure in the chambers 13, 14. Upon continued rotation of the adjusting screws 51, 52, the rubber diaphragm 49 will be forced against the plungers 33, 34, thereby causing the microswitches 23, 24, to close and illuminate the warning light l. The adjusting screws 51, 52, may then be backed off an amount sufficient to release the pressure of the diaphragm 49 against the plungers 33, 34, and shut off the warning light l. Should either of the tires $T^1$, $T^2$, be punctured or otherwise suffer any reduction in pressure, the pressure in the chambers 13, 14, being the same as that in the tires $T^1$, $T^2$, will also be reduced the same amount; whereupon, the compression springs 53, 54, will urge the discs 47, 48, against the plungers 33, 34, closing the microswitches 23, 24, and illuminating the warning light l. The driver may then check his tires to see which one is low and inflate such tire to the proper pressure or have it repaired as the case may be.

It is also possible to provide a modified form of electrical circuit wherein the microswitches 23, 24, in each of the sensing units 6 are connected to individual warning lamps l' located on the dashboard of the vehicle. By utilizing this type of circuit, the vehicle operator is able to determine exactly which dual tire assembly A has the tire of reduced pressure and can, accordingly, check either one of them.

It will be apparent that other types of warning devices, such as buzzers, bells, and the like, can be substituted for the warning lamps l, l'.

It should be understood that changes and modifications in the form, construction, arrangement, and combination of the several parts of the tire pressure indicators may be made and substituted for those herein shown and described without departing from the nature and principle of our invention.

Having thus described our invention, what we claim and desire to secure by Letters Patent is:

1. An air pressure signaling system for dual mounted pneumatic tires comprising a sensing unit adapted to be mounted on the end of a hub and provided with a pair of spaced chambers therein, said sensing unit having conduit means operatively connecting each said chamber to one of said tires, a switch mounted in each of said chambers, a diaphragm mounted in said sensing unit extending across both chambers and adapted to press against and close said switches responsive to reduction of pressure in either one of said tires below a predetermined amount, an electrically conductive element connecting said switches in parallel, electrically conductive means for contacting said element, and signaling means operatively connected to said electrically conductive means and adapted to be actuated upon closing of either of said switches.

2. An air pressure signaling system for dual mounted pneumatic tires comprising a sensing unit adapted to be mounted on the end of a hub and provided with a pair of spaced chambers therein, said unit having conduit means operatively connecting each said chamber to one of said tires so that the pressure in the chamber and its associated tire are the same, a switch operatively mounted in each chamber and each having a stem projecting outwardly of the chamber, a diaphragm disposed across one end of both chambers and having one face adapted to press against and close said switches responsive to reduction of pressure in either one of said tires below a predetermined amount, a pair of discs disposed against the other face of said diaphragm and adapted to bias the diaphragm in the direction of said switches in opposition to the pressure in said chambers, an electrically conductive collector element joining the stems of said switches so as to connect said switches in parallel, electrically conductive brush means for contacting said collector element, and signaling means operatively connected to said brush means and adapted to be actuated upon closing of either of said switches.

3. An air pressure signaling system for dual mounted pneumatic tires comprising a sensing unit adapted to be mounted on the end of a hub and provided with a pair of chambers therein, said unit having conduit means operatively connecting each said chamber to one of said tires so that the pressure in the chamber and its associated tire are the same, a switch operatively mounted in each chamber and each having a stem projecting outwardly of the chamber, a flexible rubber diaphragm disposed across one end of both chambers and having one face adapted to press against and close said switches responsive to reduction of pressure in either one of said tires below a predetermined amount, a pair of arcuate discs disposed against the other face of said diaphragm and each being substantially coaxial with one of said chambers, said discs being adapted to bias the diaphragm in the direction of said switches in opposition to the pressure in said chambers, an electrically conductive collector strip joining said stems so as to connect said switches in parallel, electrically conductive brush means for contacting said collector strip, and signaling means operatively connected to said brush means and adapted to be actuated upon closing of either of said switches.

4. In a dual tire assembly mounted on a hub, said hub being mounted concentrically on an axle-spindle having a central bore; a sensing unit secured to said hub and being provided with a pair of open-ended chambers, said unit having means for providing communication between each chamber and its associated tire, a switch operatively mounted in each of said chambers and each having a stem projecting outwardly of the chamber, a diaphragm disposed across the open ends of said chambers so as to have one face presented toward said switches, a pair of discs positioned against the opposite face of said diaphragm, means for biasing said discs toward said switches in opposition to the pressure in said chambers, an electrically conductive collector ring joining said stems so as to connect said switches in parallel, an electrically conductive brush operatively mounted in said central bore and adapted to contact said collector ring, and signaling means operatively associated with said brush, whereby reduction of pressure within either of said tires below a predetermined amount will cause one of said discs to urge said diaphragm against one of said switches and actuate the signaling means.

5. In the combination of a pair of tires mounted on a hub, said hub being mounted concentrically on an axle-spindle having a central bore; a sensing unit rigidly secured facewise against the end of said hub in spaced relation to said axle-spindle and being provided with a pair of open-ended chambers, said unit having conduit means for providing communication between each chamber and its associated tire, a pair of microswitches mounted one each in said chambers and each being provided with a plunger, a flexible diaphragm disposed across the open ends of said chambers so as to have one face presented toward said plungers, a pair of discs positioned against the opposite face of said diaphragm in substantial axial alignment with said plungers, means for biasing said discs and diaphragm toward said plungers, an electrically conductive collector ring connecting said microswitches in parallel, an insulating sleeve mounted in the bore of said axle, an electrically conductive brush slidably mounted in said sleeve, means for biasing said brush into contact with said connector ring, and signaling means operatively associated with said brush, whereby reduction of pressure within either of said tires below a predetermined amount will cause one of said discs to urge said diaphragm against one of said plungers and actuate the signaling means.

6. An air pressure signaling system for pneumatic tires comprising a sensing unit provided with a base and a cap, said base having a pair of open-ended chambers each of which is exposed to the pressure in the tires, a microswitch mounted in each chamber and each being provided with a plunger, a diaphragm interposed between the base and cap and disposed across the open ends of said chambers so as to have one face presented toward said plunger, a pair of discs operatively mounted in said cap and positioned against the opposite face of said diaphragm in substantial alignment with said plungers, means for biasing said discs toward said plunger, and an electrically conductive element operatively connecting said switches in parallel.

7. An air pressure signaling system for pneumatic tires comprising a sensing unit provided with a base and a cap, said base having a pair of open-ended chambers each exposed to the pressure in the tires, a microswitch mounted in each chamber and each being provided with a plunger, a diaphragm interposed between the base and cap and disposed across the open ends of said chambers so as to have one face presented toward said plunger, a pair of arcuate discs shiftably mounted in said cap and positioned against the opposite face of said diaphragm in substantial alignment with said plungers, adjustable spring means biasing said discs and diaphragm toward said plunger, and an electrically conductive element operatively connecting said switches in parallel.

8. An air pressure signaling system for pneumatic tires comprising a sensing unit provided with a base and a cap, said base having a pair of spaced open-ended chambers, a microswitch mounted in each chamber and each being provided with a plunger, a diaphragm interposed between the base and cap and disposed across the open ends of said chambers so as to have one face presented toward said plunger, spring means mounted in said chambers and adapted to bias the switches in the direction of said diaphragm, a pair of arcuate discs positioned against the opposite face of said diaphragm in substantial alignment with said plungers, adjustable spring means biasing said discs and diaphragm toward said plunger, and an electrically conductive element connecting said switches in parallel.

References Cited in the file of this patent

UNITED STATES PATENTS

| | | |
|---|---|---|
| 2,362,883 | Cecil | Nov. 14, 1944 |
| 2,445,959 | Luper | July 27, 1948 |
| 2,523,594 | Sagaser | Sept. 26, 1950 |
| 2,669,617 | Sletten et al. | Feb. 16, 1954 |
| 2,822,530 | Roten | Feb. 4, 1958 |